United States Patent
Bai et al.

(10) Patent No.: US 9,361,092 B1
(45) Date of Patent: Jun. 7, 2016

(54) RECOMMENDING UPGRADE ACTIONS DURING MIGRATION

(71) Applicant: International Business Machines Corporation, Armonk, NY (US)

(72) Inventors: Kun Bai, Hartsdale, NY (US); Jinho Hwang, Ossining, NY (US); John J. Rofrano, Mahopac, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/641,753

(22) Filed: Mar. 9, 2015

(51) Int. Cl.
*G06F 9/44* (2006.01)
*G06F 9/445* (2006.01)
*H04L 12/24* (2006.01)
*H04L 29/08* (2006.01)

(52) U.S. Cl.
CPC *G06F 8/65* (2013.01); *H04L 41/12* (2013.01); *H04L 67/34* (2013.01)

(58) Field of Classification Search
CPC ............... G06F 8/65; G06F 8/67; G06F 8/68
USPC ......................................................... 717/168
See application file for complete search history.

(56) References Cited

U.S. PATENT DOCUMENTS

| | | | |
|---|---|---|---|
| 7,752,239 B2 | 7/2010 | Richards et al. | |
| 7,769,720 B2 | 8/2010 | Armington | |
| 8,234,156 B2 | 7/2012 | Comas et al. | |
| 8,719,619 B2 | 5/2014 | Li et al. | |
| 8,850,423 B2 | 9/2014 | Barkie et al. | |
| 2005/0066019 A1* | 3/2005 | Egan | G06F 8/65 709/223 |
| 2012/0054731 A1 | 3/2012 | Aravamudan et al. | |
| 2012/0137278 A1* | 5/2012 | Draper | G06F 8/65 717/170 |
| 2014/0053072 A1 | 2/2014 | Guo et al. | |
| 2014/0244816 A1 | 8/2014 | Anerousis et al. | |
| 2015/0100943 A1* | 4/2015 | Gabel | G06Q 30/02 717/106 |
| 2015/0199265 A1* | 7/2015 | Kripalani | G06F 11/3664 717/135 |

FOREIGN PATENT DOCUMENTS

WO 2013019185 A1 2/2013

OTHER PUBLICATIONS

Zeng et al.; "Managing Risk in Multi-node Automation of Endpoint Management", © 2014 IEEE.
U.S. Appl. No. 61/376,457, filed Aug. 24, 2010; Entitled "Method, System and Computer Programs to Assist Migration to a Cloud Computing Environment".
U.S. Appl. No. 61/927,332, filed Jan. 14, 2014; Entitled "Managing Risk in Multi-Node Automation of Endpoint Management".
U.S. Appl. No. 14/450,422, filed Aug. 4, 2014; Entitled "System and Method for Server Validation With Dynamic Assembly of Scripts".
U.S. Appl. No. 14/503,254, filed Sep. 30, 2014; Entitled "Managing Risk in Multi-Node Automation of Endpoint Management".

* cited by examiner

*Primary Examiner* — John Chavis
(74) *Attorney, Agent, or Firm* — Alexa L. Ashworth

(57) ABSTRACT

Embodiments of the present invention provide methods, systems, and computer program products for recommending an upgrade action during migration. In one embodiment, a configuration of servers are loaded in a graph format onto a database, and from a group of templates in the database, a closest matching configuration is identified. An action plan is determined from an impact score of several update actions and the action plan is stored in the database.

20 Claims, 7 Drawing Sheets

RECOMMENDING UPGRADE ACTIONS DURING MIGRATION

BACKGROUND OF THE INVENTION

The present invention relates generally to the field of upgrading servers, and more particularly to recommending upgrade actions during migration based on risk ratings and active learning.

Advances in virtualization and mainframe hardware have facilitated the consolidation of applications onto a fewer number of centralized servers. In some cases, it is desirable to migrate or rebuild applications running on servers in a datacenter to a cloud datacenter. These applications may need a version upgrade, resource upgrade, bug fixes, or security patches. Often, multiple applications running on the servers may need to be upgraded at the same time and often have certain dependencies on each other which cannot be violated during the upgrade or rebuild.

SUMMARY

According to one embodiment of the present invention, a method for recommending an upgrade action during migration is provided, the method comprising: loading a configuration of servers in a graph format onto a database; identifying a closest matching template to the configuration of servers from the database; loading a configuration of actions associated with the configuration of servers; updating, from a public repository, one or more servers from the configuration of servers; determining an action plan, based, at least in part, on an impact score for each update action; and storing the determined action plan in the database.

Another embodiment of the present invention provides a computer program product for recommending an upgrade action during migration, based on the method described above.

Another embodiment of the present invention provides a computer system for recommending an upgrade action during migration based on the method described above.

DETAILED DESCRIPTION

Advances in virtualization and mainframe hardware have facilitated the consolidation of applications onto a fewer number of centralized servers. However, the process of planning and performing such a migration may be time-consuming, costly, and prone to errors or failures. Embodiments of the present invention provide methods and systems for recommending upgrade actions on server and application-level topology during the migration process, based on an impact risk and dependencies of each action.

Figure 1:
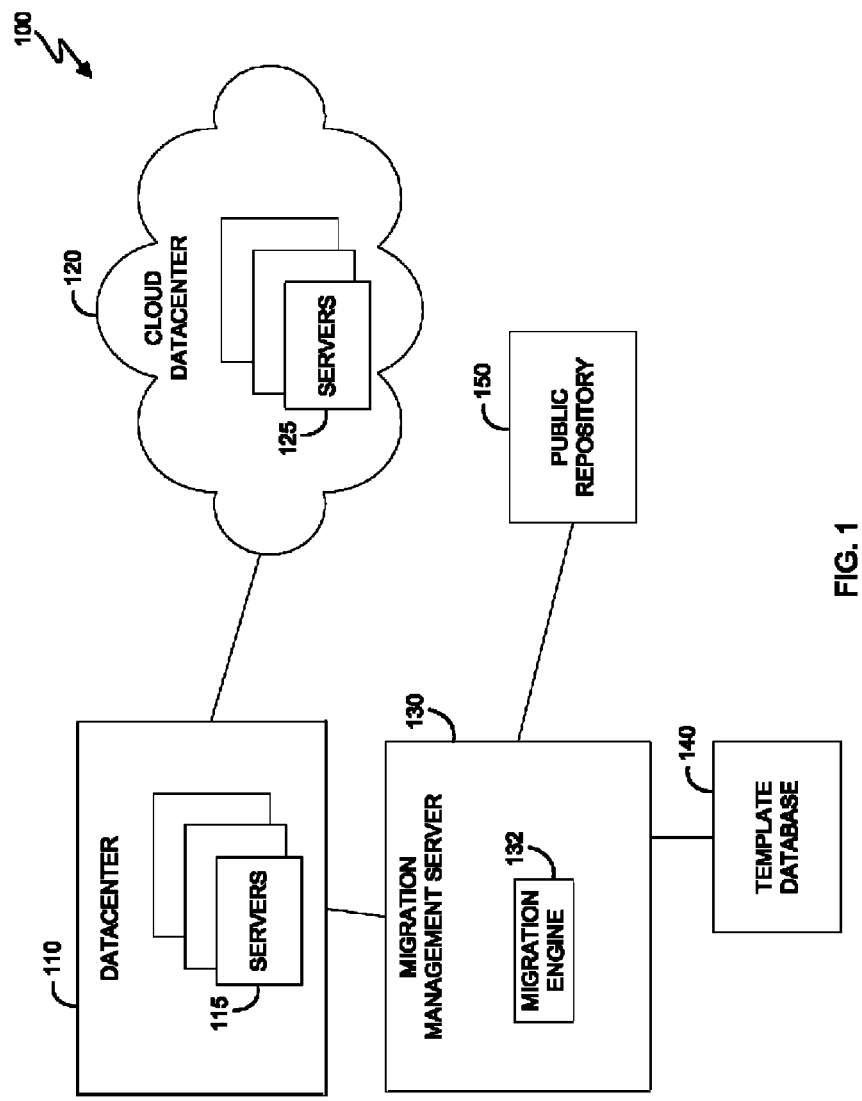
FIG. 1 depicts a functional block diagram of a computing environment, in accordance with an embodiment of the present invention.

The present invention will now be described in detail with reference to the Figures. FIG. 1 depicts a functional block diagram illustrating a computing environment, generally designated 100, in accordance with an embodiment of the present invention. Modifications to computing environment 100 may be made by those skilled in the art without departing from the scope of the invention as recited by the claims. In an exemplary embodiment, computing environment 100 includes datacenter 110, cloud datacenter 120, migration management server 130, template database 140, and public repository 150.

Datacenter 110 is a centralized facility for managing data for various types of organizations. Datacenter 110 comprises several servers 115 which manage network resources. In some embodiments, datacenter 110 may comprise one or more of a web server, a network server, a file server, and a print server, each comprising a separate physical machine. Cloud datacenter 120 includes one or more virtual servers 125. Cloud datacenter 120 is an off-premise form of computing, and stores data on the Internet.

Migration management server 130 includes migration engine 132. Migration management server 130 may be a management server, a web server, or any other electronic device or computing system capable of receiving and sending data. Migration engine 132 can receive template information from database 140 and can mine application dependencies from public repository 150. Migration engine 132 is capable of determining upgrades and executing upgrades to cloud datacenter 120. In this exemplary embodiment, migration engine 132 is capable of identifying an application upgrade action based on impact and implementing a graph-based discovery upgrade action.

Template database 140 is an information repository for storing data associated with one or more action plans including their impact risk. In this exemplary embodiment, the data is stored in a graph format and may be accessed by migration engine 132.

Public repository 150 is a public software storage location, from which software packages may be accessed or retrieved, and installed on a computing device. Package management systems, such as Yum or apt-get, are often provided, which search for, install, and otherwise manipulate software packages from public repository 150.

Figure 2:
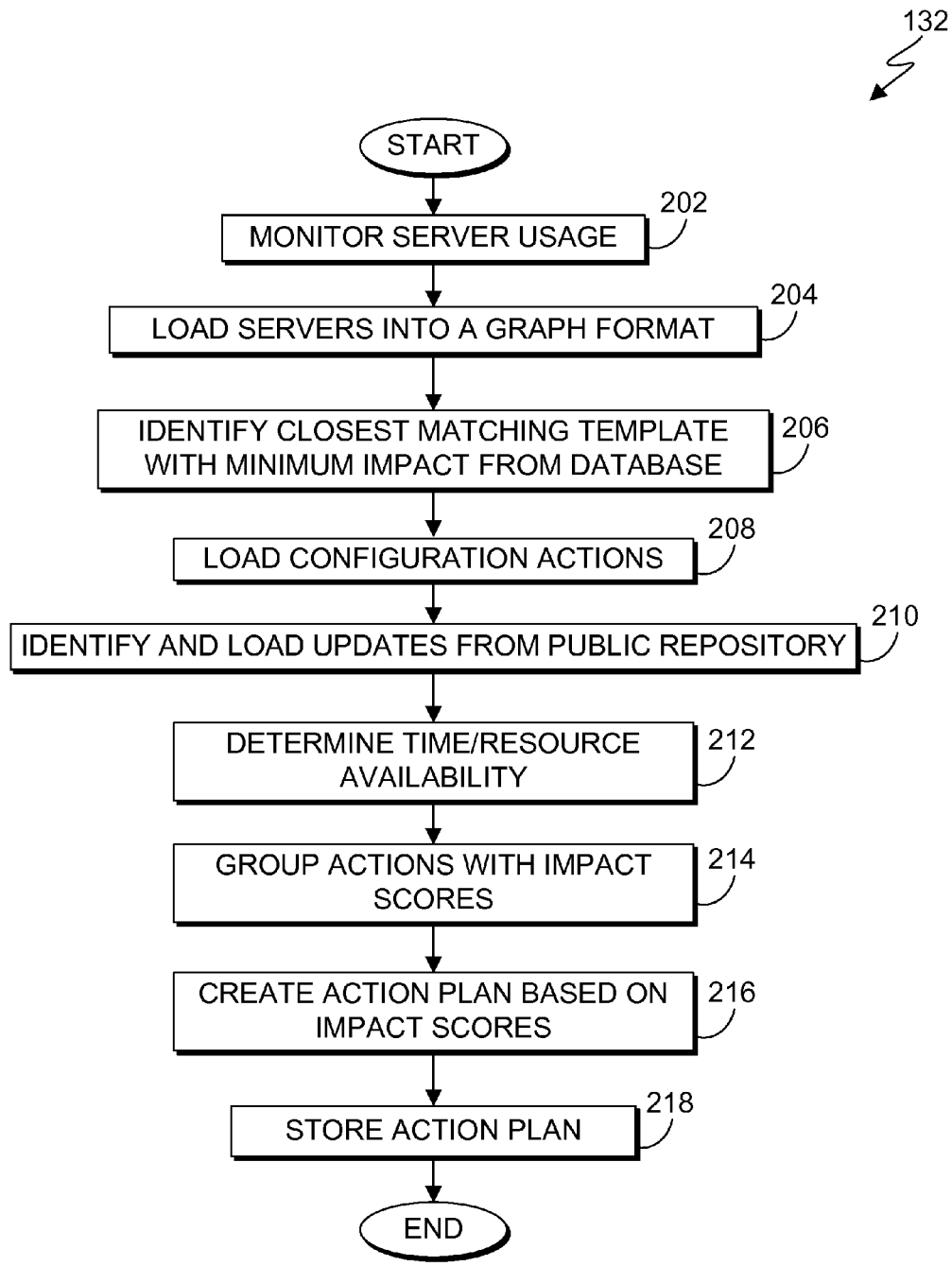
FIG. 2 depicts a flowchart illustrating operational steps for identifying an application upgrade action based on impact, in accordance with an embodiment of the present invention.

FIG. 2 depicts a flowchart illustrating operational steps of migration engine 132 for identifying an application upgrade action based on impact, in accordance with an embodiment of the present invention.

In step 202, migration engine 132 monitors the server usage. In this exemplary embodiment, migration engine 132 monitors the server usage for a particular application. For example, migration engine 132 may monitor the resource requirements of the application, the current server usage values of the application, and the anticipated usage values of the application after a server migration.

In step 204, migration engine 132 loads the servers running the particular application into a graph format. In this exemplary embodiment, each server is represented as a node of the graph, and each node has an application type and resource requirements. The connections of the graph (i.e., edges) represent a relation between two nodes (i.e., servers).

Figure 3:
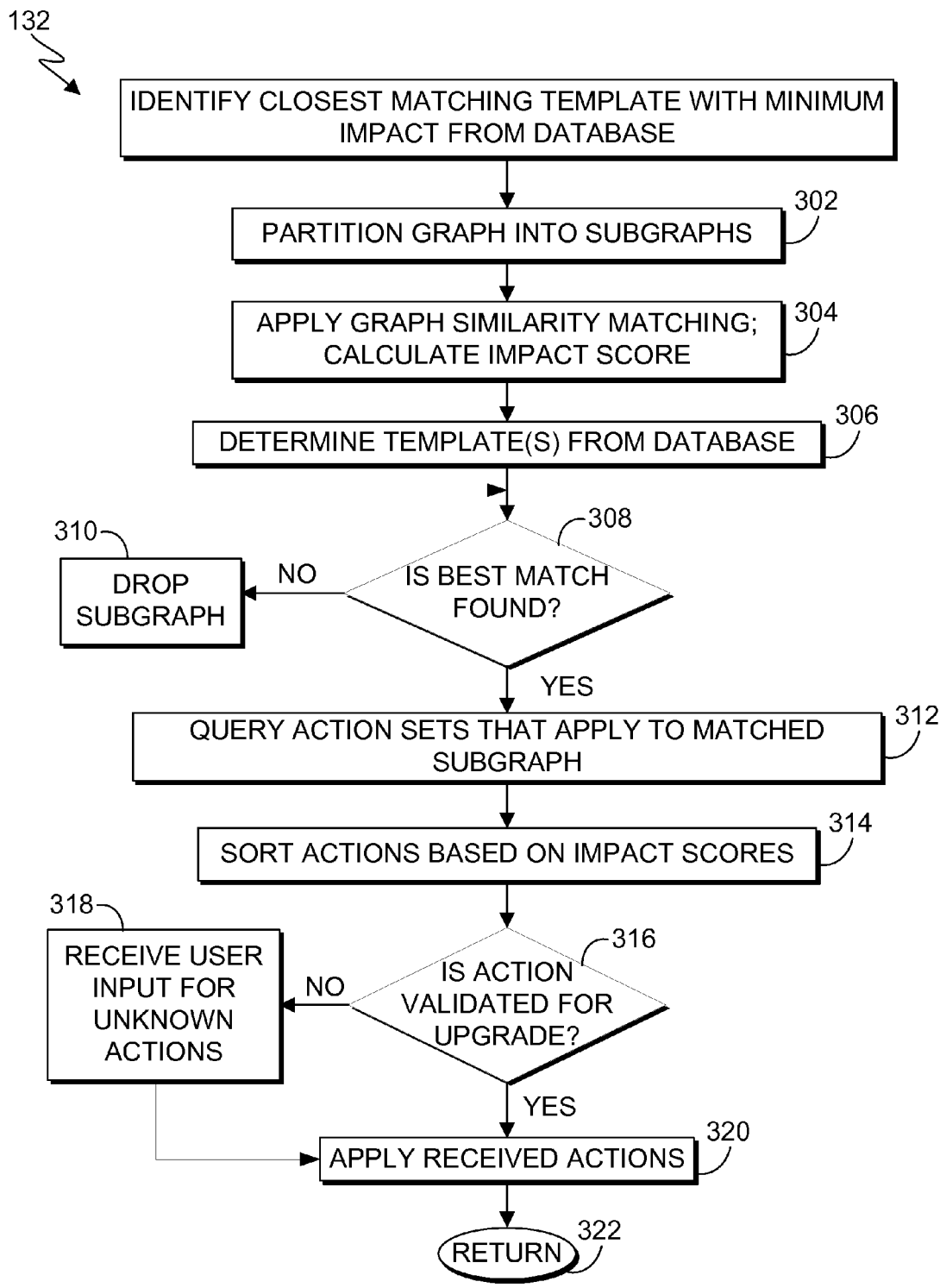
FIG. 3 depicts a flowchart illustrating operational steps for calculating an action match search algorithm for performing graph-based upgrade action discovery, in accordance with an embodiment of the present invention.

In step 206, migration engine 132 identifies the closest matching template with the minimum impact from template database 140, using the action match search algorithm of FIG. 3.

In step 208, migration engine 132 loads the configuration actions. In this exemplary embodiment, data associated with the closest matching template (step 206) is loaded. The data may include, for example, history, similar configuration schemes, latest software updates, and latest bug fixes and patches.

In step 210, migration engine 132 identifies and loads updates from public repository 150. In this exemplary embodiment, migration engine 132 connects to an external data source, such as public repository 150, and loads any updates or upgrades. An update or upgrade may include: the rightsizing of memory and disk, an upgrade of application dependent packages, and upgrades of web servers, databases, and operating systems (OS). For example, a security patch for a particular application and an Apache version upgrade may be downloaded from public repository 150.

In step 212, migration engine 132 determines a time and resource availability of the application. In this exemplary embodiment, migration engine 132 obtains the time and resource availability information of the application, in order to determine whether the application may be upgraded at the time, or not. For example, migration engine 132 may receive the release time of an upgrade and determine the particular software may be upgraded with the public release.

In step 214, migration engine 132 groups upgrade actions with their impact scores. In this exemplary embodiment, migration engine 132 determines and groups upgrade actions with their respective impact scores, taking into account software dependencies and identifying a scaling point. For example, migration engine 132 may determine a dependency among two actions (e.g., Tomcat cannot be upgraded before MySQL), and identify a scaling point by analyzing the application to identify points of entry and network flows at the database level, web level, and cache level. In another example, migration engine 132 may determine that an Apache version upgrade action has dependencies from PHP and MySQL servers, resulting in an impact score of eight (8). In this exemplary embodiment, migration engine 132 may also determine a load balancing mechanism for predicting the load and number of hits for future usage, determining the best arrangement of the replication servers to ensure future reliability. Impact scores of particular upgrade actions on particular servers may be learned over time.

In step 216, migration engine 132 creates an action plan based on the impact scores. In this exemplary embodiment, migration engine 132 designs an upgrade and/or rebuilding plan of action based on information such as impact score, time, cost, and available resources. At this time, migration engine 132 also resolves any discovered conflicts between upgrade actions by checking the library dependencies. For example, in resolving a version conflict in which an Apache server upgrade requires libxml version 2.5.0 or higher, and PHP 5.5.8 requires libxml version 2.6.0 or higher, migration engine 132 may determine to only install libxml version 2.6.0 or higher among the available packages (i.e., the libxml version which is compatible with each conflicting application). In another example, in resolving a resource conflict in which there is a vCenter server upgrade to version 5.5, and vCenter server 5.5 can only run more than 4G of memory, migration engine 132 may determine to upgrade the memory to have more than 4G of memory. In this exemplary embodiment, the user is prompted for validation if a new step is created during the conflict resolution.

In step 218, migration engine 132 stores the created action plan. In this exemplary embodiment, migration engine 132 stores the created action plan in a graph format and saves the action plan to template database 140 for future determinations. For example, a created action plan, along with the specific time, cost, and resource requirements, may be saved to template database 140 for use in future action plan determinations.

Accordingly, by performing the operational steps of FIG. 2, an action plan for upgrading actions is created for a particular application, taking into account time, cost, and resource availability. By repeatedly performing the operational steps for each application, a database storing action plans may be continually updated with additional action plans for future use.

FIG. 3 depicts a flowchart illustrating operational steps of migration engine 132 for calculating an action match search algorithm for performing graph-based upgrade action discovery, in accordance with an embodiment of the present invention. The action match search algorithm uses known graph theory calculations to determine upgrade actions between multiple servers by identifying the closest matching action template from the database, with the minimum impact score.

In step 302, migration engine 132 partitions the graph into subgraphs. In this exemplary embodiment, the graph, representing the entire set of applications and actions, is partitioned into multiple subgraphs, based on similarities. For example, all business-based applications may be partitioned into one subgraph. In this exemplary embodiment, migration engine 132 also receives partition parameter information in order to determine the components of each subgraph. Each edge (i.e., link that connects two nodes within the graph) represents an impact score for the components it connects. In this exemplary embodiment, all edges are initially set to an impact score of five (5), but the impact score may change as each individual impact is calculated.

In step 304, migration engine 132 applies graph similarity matching to each subgraph and calculates an impact score. In this exemplary embodiment, a query, or edit distance-based similarity matching, is applied to each determined subgraph to calculate the impact score. Matches are then ranked by impact score (e.g., the lowest impact scores to the highest impact scores).

In step 306, migration engine 132 determines the template(s) from template database 140 for each discovered application group. In this exemplary embodiment, template database 140 stores the templates containing the relevant application and/or server information patterns. Migration engine 132 accesses template database 140 and identifies the stored templates for each application group.

In step 308, migration engine 132 determines whether a best match is found. A best match is found, when migration engine 132 can find a match or closest match between the queried subgraphs and the stored application templates in template database 140. If, in step 308, migration engine 132 determines that a best match is not found, then, in step 310, migration engine 132 drops the subgraph. If migration engine 132 determines that a subgraph is not the best match to the template database, then this subgraph is not considered further in the calculation.

If, in step 308, migration engine 132 determines that a best match is found, then, in step 312, migration engine 132 queries the action sets that apply to the matched subgraph. In this exemplary embodiment, migration engine 132 searches the history of the executed actions and the individual ratings of each action.

In step 314, migration engine 132 sorts the actions from the action sets based on their impact scores. From the determined set of relevant action sets that apply to the matched subgraph, migration engine 132 sorts each action based on its related impact score and identifies the set of relevant actions with the least impact (i.e., the lowest failure rate).

In step 316, migration engine 132 determines whether the action is validated for a particular upgrade. An action is validated for an upgrade, if the potential upgrade action has the lowest impact score and lowest potential risk. If, in step 316, migration engine 132 determines that the action is not validated for the upgrade, then, in step 318, migration engine 132 receives a user input for the unknown actions. If migration engine 132 is not able to determine whether an action is appropriate for upgrade, then migration engine 132 sends a request to a user to validate the potential upgrade action before executing the upgrade action.

If, in step 316, migration engine 132 determines that the action is validated for the upgrade, then, in step 320, migration engine 132 applies the received actions. If migration engine 132 is able to determine that a potential upgrade action is appropriate (i.e., validated for the particular upgrade), then migration engine 132 will automatically execute the received upgrade actions. In step 322, the subroutine returns to step 208 of FIG. 2.

Accordingly, by performing the operational steps of FIG. 3, an action match search algorithm is able to compare a set of actions stored in a graph format, to a set of actions saved in a database, in order to find an upgrade plan with the lowest impact and risk. This algorithm is able to consider the impact of composite actions.

Figure 4:
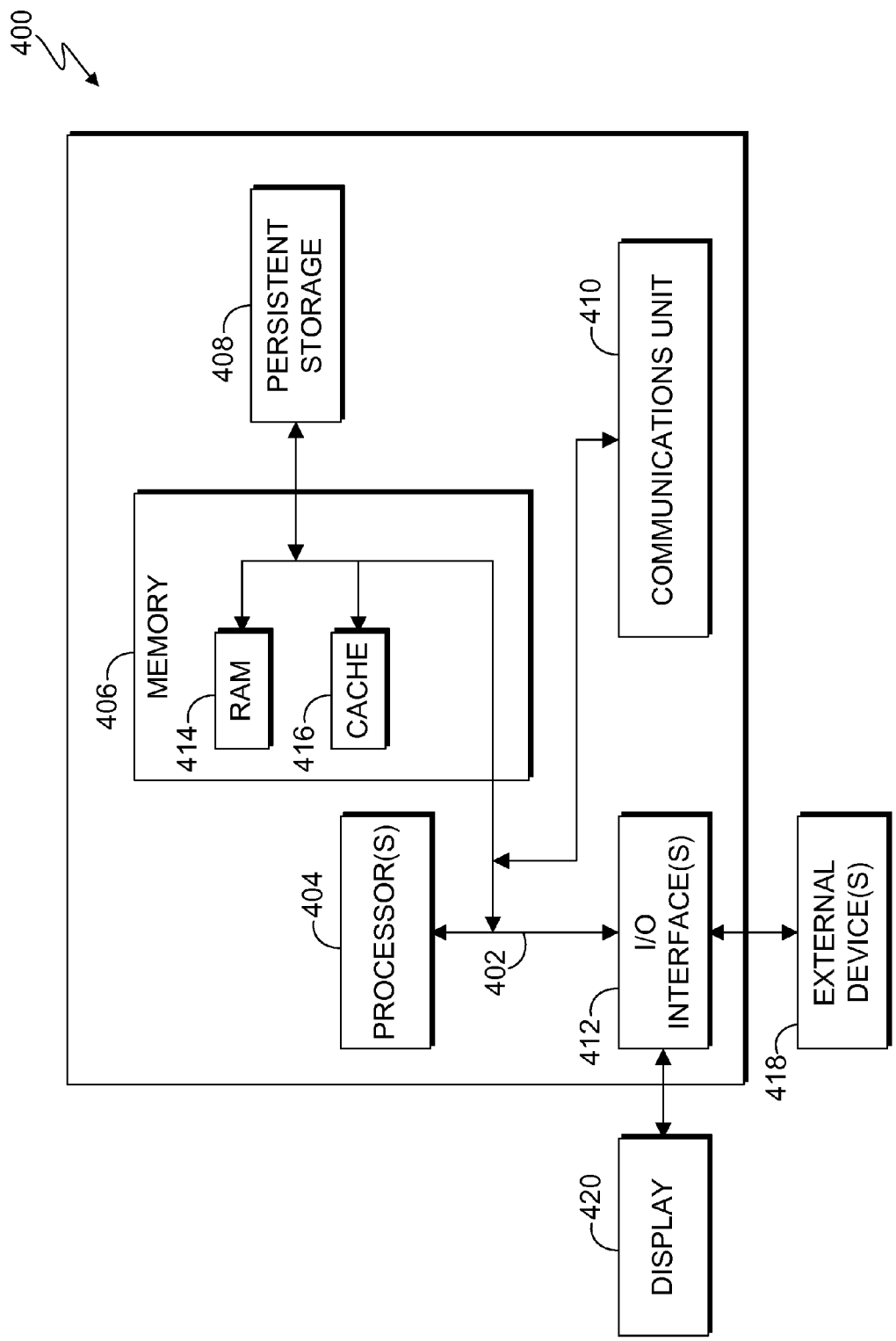
FIG. 4 depicts a block diagram of internal and external components of a data processing system, in accordance with an embodiment of the present invention.

FIG. 4 depicts a block diagram of components, in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

The programs are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. The programs may be downloaded to persistent storage 408 through communications unit 410.

I/O interface(s) 412 allows for input and output of data with other devices that may be connected to migration management server 130. For example, I/O interface 412 may provide a connection to external devices 418, such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the programs, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
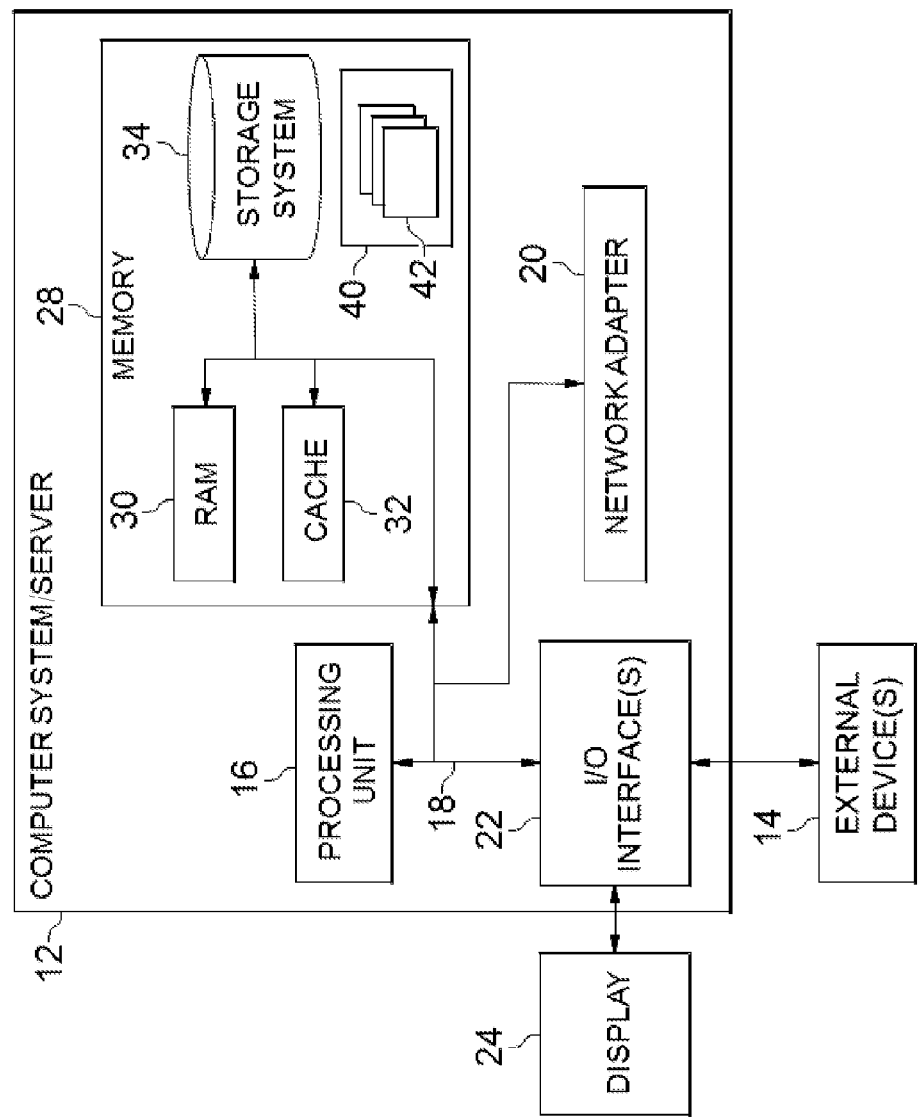
FIG. 5 depicts a cloud computing node, in accordance with an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
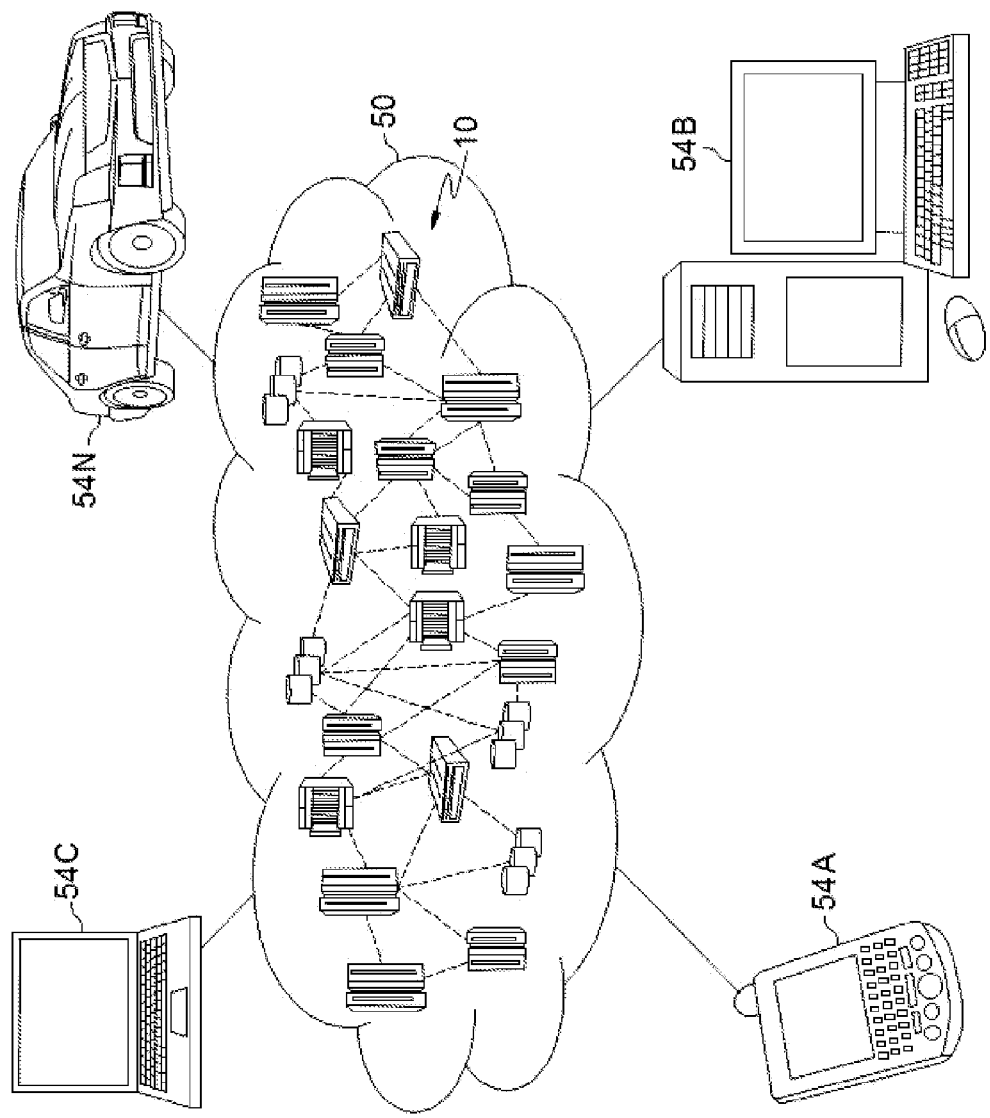
FIG. 6 depicts a cloud computing environment, in accordance with an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
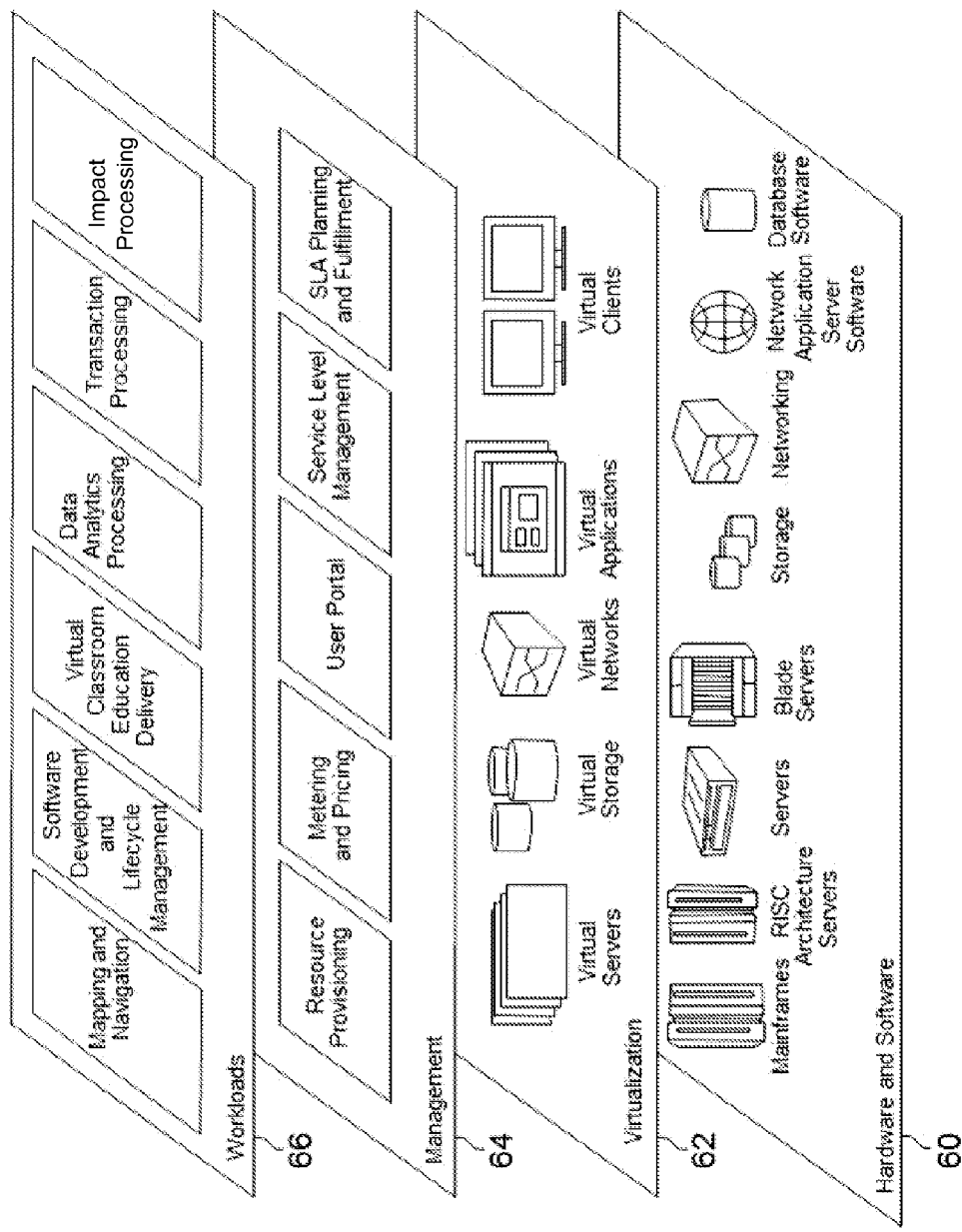
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and impact processing.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for recommending an upgrade action during migration, the method comprising:
   loading a configuration of servers in a graph format onto a database;
   identifying a closest matching template to the configuration of servers from the database;
   loading a configuration of actions associated with the configuration of servers;
   updating, from a public repository, one or more servers from the configuration of servers;
   determining an action plan, based, at least in part, on an impact score for each update action; and
   storing the determined action plan in the database.

2. The method of claim 1, wherein each update action comprises: rightsizing of memory and disk, upgrade of application dependent packages, upgrades of web servers, databases, and operating systems (OS).

3. The method of claim 1, wherein each update action is selected based on historical data, as the configuration is being prepared from migration to target server.

4. The method of claim 1, further comprising:
   detecting a failure of an update action, using a server log or a user.

5. The method of claim 1, further comprising:
   utilizing the template to create a pattern, wherein the pattern is used to learn and capture actions which resolve conflicts, based on a knowledge base and human expertise.

6. The method of claim 1, further comprising:
   determining a risk associated with each update action, wherein the risk comprises: business level criticality of servers, effort to execute the action, cost to execute the action, cost to an upgrading, licensing considerations, and reported issues with latest versions of updates.

7. A computer program product comprising:
a computer readable storage medium and program instructions stored on the computer readable storage medium, the program instructions comprising:
program instructions to load a configuration of servers in a graph format onto a database;
program instructions to identify a closest matching template to the configuration of servers from the database;
program instructions to load a configuration of actions associated with the configuration of servers;
program instruction to update, from a public repository, one or more servers from the configuration of servers;
program instructions to determine an action plan, based, at least in part, on an impact score for each update action; and
program instructions to store the determined action plan in the database.

8. The computer program product of claim 7, wherein each update action comprises: rightsizing of memory and disk, upgrade of application dependent packages, upgrades of web servers, databases, and operating systems (OS).

9. The computer program product of claim 7, wherein the update action is selected based on historical data, as the configuration is being prepared from migration to target server.

10. The computer program product of claim 7, further comprising:
program instructions to detect a failure of an update action, using a server log or a user.

11. The computer program product of claim 7, further comprising:
program instructions to utilize the template to create a pattern, wherein the pattern is used to learn and capture actions which resolve conflicts, based on knowledge base and human expertise.

12. The computer program product of claim 7, further comprising:
program instructions to determine a risk associated with each update action, wherein the risk comprises: business level criticality of servers, effort to execute the action, cost to execute the action, cost to an upgrading, licensing considerations, and reported issues with latest versions of updates.

13. A computer system comprising:
one or more computer processors;
one or more computer readable storage media;
program instructions stored on the one or more computer readable storage media for execution by at least one of the one or more processors, the program instructions comprising:
program instructions to load a configuration of servers in a graph format onto a database;
program instructions to identify a closest matching template to the configuration of servers from the database;
program instructions to load a configuration of actions associated with the configuration of servers;
program instruction to update, from a public repository, one or more servers from the configuration of servers;
program instructions to determine an action plan, based, at least in part, on an impact score for each update action; and
program instructions to store the determined action plan in the database.

14. The computer system of claim 13, wherein each update action comprises: rightsizing of memory and disk, upgrade of application dependent packages, upgrades of web servers, databases, and operating systems (OS).

15. The computer system of claim 13, further comprising:
one or more databases, the one or more databases having a plurality of pattern records, wherein each pattern record represents a migration configuration of an old system to a new system, and wherein the old system comprises one or more old assets and the new system comprises one or more new assets.

16. The computer system of claim 13, further comprising:
one or more inputs for providing a target old system configuration;
a migration engine which identifies one or more target new configurations which are possible conversions for the target old system configuration; and
a risk assessor which provides a risk of installation score for each of the target new configurations.

17. The computer system of claim 13, wherein each update action is selected based on historical data, as the configuration is being prepared from migration to target server.

18. The computer system of claim 13, further comprising:
program instructions to detect a failure of an update action, using a server log or a user.

19. The computer system of claim 13, further comprising:
program instructions to utilize the template to create a pattern, wherein the pattern is used to learn and capture actions which resolve conflicts, based on knowledge base and human expertise.

20. The computer system of claim 13, further comprising:
program instructions to determine a risk associated with each update action, wherein the risk comprises: business level criticality of servers, effort to execute the action, cost to execute the action, cost to an upgrading, licensing considerations, and reported issues with latest versions of updates.

* * * * *